United States Patent [19]
Franks et al.

[11] 4,112,794
[45] Sep. 12, 1978

[54] TUBE CUTTER WITH PHASE CHANGER

[75] Inventors: Lawrence A. Franks; Steven L. Stroup; James E. Perry, all of Sturgis, Mich.

[73] Assignee: Burr Oak Tool & Gauge Company, Sturgis, Mich.

[21] Appl. No.: 830,389

[22] Filed: Sep. 6, 1977

[51] Int. Cl.² .......................... B23B 3/04; B23B 5/14
[52] U.S. Cl. .......................................... 82/64; 82/72; 82/92
[58] Field of Search ........................ 82/64, 72, 73, 92

[56] References Cited
U.S. PATENT DOCUMENTS

| | | | |
|---|---|---|---|
| 1,828,371 | 10/1931 | Hyde et al. | 82/64 |
| 2,281,450 | 4/1942 | Motch, Jr. et al. | 82/64 |
| 2,586,209 | 2/1952 | Coretti | 82/72 |
| 3,772,945 | 11/1973 | Varga | 82/73 |

*Primary Examiner*—Harrison L. Hinson
*Attorney, Agent, or Firm*—Blanchard, Flynn, Thiel, Boutell & Tanis

[57] ABSTRACT

A tube cutoff device which includes a rotatable cutter head for radially slidably supporting a cutter and a pair of support rollers in circumferentially spaced relationship. A stationary tubular guide extends through the cutter head for permitting a tube to be fed therethrough and positioned between the cutter and the support rollers. A cam is rotatably supported on the cutter head and cooperates with the cutter and rollers for displacing same radially inwardly into engagement with the tube which is to be cut. The cutter head and the cam are rotatably drivably connected to first and second power trains, respectively, which cause the cam and cutter head to normally rotate at the same rotational speed. A phase change device is coupled between the first and second power trains and, when activated, causes the second power train and hence the cam to be rotated at a slightly different rotational speed, which differential rotational speed causes the cutter and support rollers to be cammed radially inwardly for supporting and cutting engagement with the tube.

11 Claims, 7 Drawing Figures

TUBE CUTTER WITH PHASE CHANGER

FIELD OF THE INVENTION

This invention relates to an apparatus for cutting a long length of tubing into selected lengths. More particularly, the apparatus employs a cutter head which rotates at a high speed and has a cutter mounted thereon, and a phase change device which when activated causes a small rotational differential between the speeds of the cutter head and the cutter so that the latter is cammed radially inwardly into engagement with the tubing while still being rotated at high speed so as to cause cutting of the tubing.

BACKGROUND OF THE INVENTION

Persons familiar with the operation of tube cutting machinery have long been aware of the need for an apparatus for cutting tubular stock, such as copper pipe for cooling coils, whereby to avoid the formation of radially inwardly projecting burrs, and to reduce the amount of maintenance required to keep the cutting device in satisfactory cutting condition. It has been common practice to use cutters which are orbited about the tube in order to effect cutting thereof. This arrangement creates complicated and costly maintenance problems resulting from the complicated mechanism required to effect movement of the cutters. Moreover, this type of equipment often forms a radially inwardly projecting burr on the tube adjacent the cut. A structure of this general type is disclosed in U.S. Pat. No. 3,724,073.

To avoid the use of an orbiting cutter of the type described above, it has also been proposed to utilize a cutter which is radially actuated into engagement with the tube by means of an axially shiftable cam, as illustrated in U.S. Pat. No. 3,772,945. However, this structure employs a cam which rotates with the cutter head and has an annular groove which receives therein a cam follower which is secured to an axially shiftable activating member. This structure, due to the continued high speed rotation between the rotatable cam and the axially shiftable activating member, causes excessive wear and hence requires substantial maintenance. This structure is also more subject to binding due to the structural and functional relationships which exist between the cooperating components of the activating linkage. Further, the activating linkage results in the cutter being moved inwardly into engagement with the tube and cutting thereof at the same rate, so that the initial inward movement of the cutter prior to contact with the tube must thus be slower than desired since this speed is determined by the radial speed of the cutter during the cutting engagement thereof with the tube. The machine of this patent thus cannot be made to operate in the most efficient manner so as to result in the maximum production rate.

The known tube cutting machines, as exemplified by those described above, are also disadvantageous in that these machines generally can be made to efficiently cut only a single diameter tube, and any attempt to utilize these machines to cut a tube of a different diameter normally requires a major rebuilding of the machine, including a substantial disassembly and replacement of the cutting head structure in order to permit utilization of the machine with a different diameter tube. Needless to say, this results in not only shutdown of the machine for a long period of time, coupled with the expenditure of a large amount of manual labor, but also requires the maintaining of many different replacement parts suitable to accomodate tubes of different diameters. These known machines are thus inefficient and undesirable with respect to their capability of accomodating and cutting tubes of different diameters.

Accordingly, it is an object of the present invention to provide an improved tube cutting apparatus which overcomes the above-mentioned disadvantages. More specifically, it is an object of this invention to provide an improved tube cutting apparatus which employs a rotatable cutter head having a cutter mounted thereon and rotatable therewith, together with a cam which coacts with the cutter and also rotates with the cutting head. A phase change device is drivingly connected between the cam and the cutter and, when activated, causes a slight differential rotation between the cam and the cutter so that the latter is moved inwardly into cutting engagement with the tube. The phase change device is preferably activated by a drive arrangement which permits a rapid movement of the cutter inwardly into a position directly adjacent the tube, followed by a slower radial movement of the cutter during the cutting engagement thereof with the tube.

Another object of this invention is to provide an improved tube cutting apparatus, as aforesaid, wherein the rotatable cam employs a series of camming portions suitable for cooperation with the cutter, which camming portions are designed for use with tubes of different diameters, whereby the tooling assembly can be easily and efficiently manually adjusted with respect to the cam to permit any selected camming portion to be positioned in an activating operative relationship with the cutter. This improved cam structure thus permits the machine to be readily adjusted so as to permit efficient cutting of tubes of several different diameters without requiring a major disassembly or rebuilding of the machine, and without requiring the interchanging or replacement of machine components.

Still a further object of this invention is to provide an improved tube cutoff machine, as aforesaid, which permits a tube cutting operation to be carried out in a more efficient and time-saving manner, which results in a very desirable cutting of the tube so that the cut edges are substantially free of burrs, which can be made to operate substantially automatically, and which requires only a minimum of maintenance.

Other objects and purposes of the invention will be apparent to persons familiar with this type of machine upon reading the following specification and inspecting the accompanying drawings.

Figure 1:
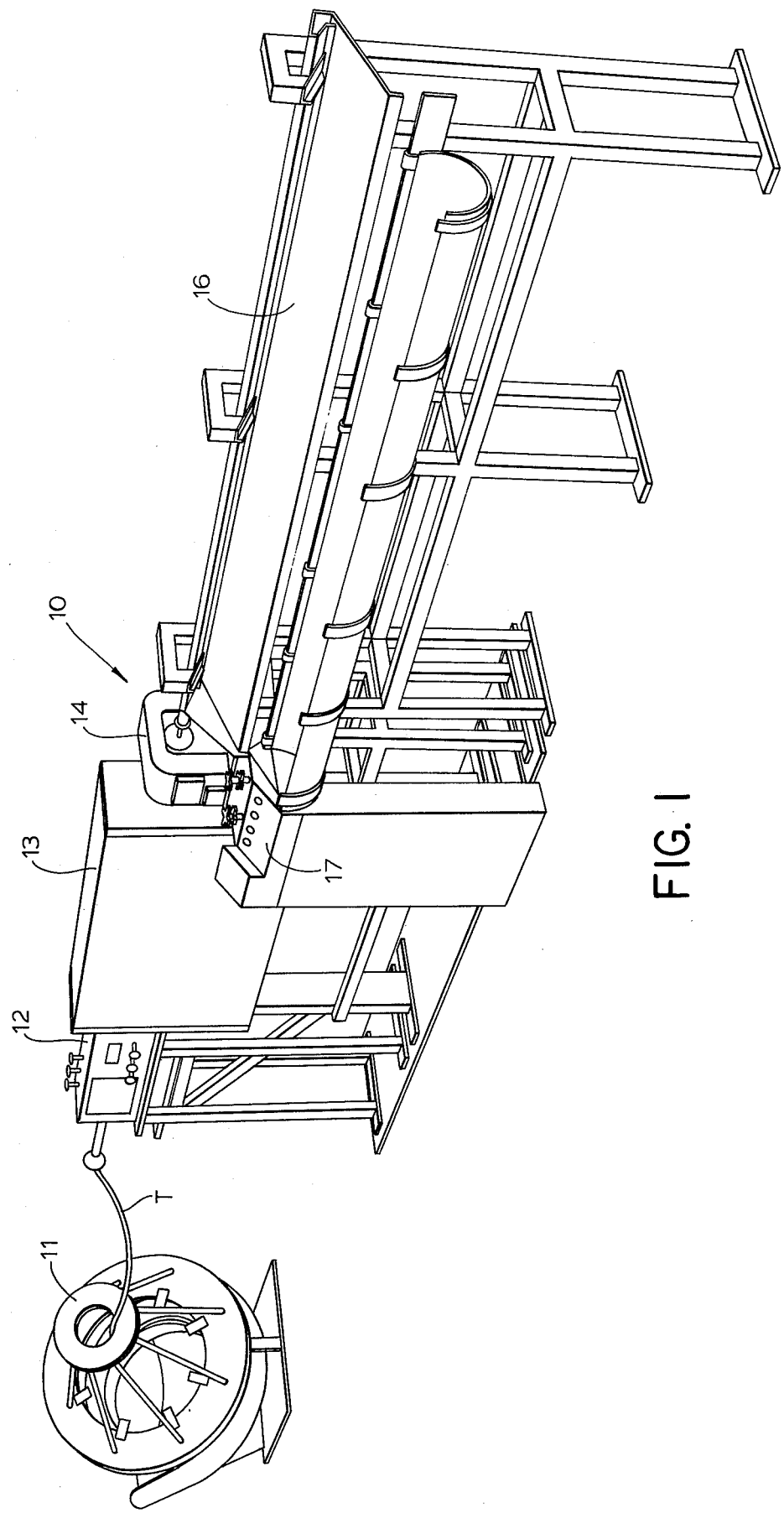
FIG. 1 is a perspective view of an overall tube cutting apparatus.

Certain terminology will be used in the following description for convenience in reference only and will not be limiting. For example, the words "upwardly," "downwardly," "rightwardly," and "leftwardly" will refer to directions in the drawings to which reference is made. The word "forwardly" will refer to the feeding direction of the tube through the machine, which direction is from right to left in FIG. 2, and is from left to right in FIG. 1. The words "inwardly" and "outwardly" will refer to directions toward and away from, respectively, the geometric center of the machine and designated parts thereof. Said terminolgy will include the words specifically mentioned, derivatives thereof, and words of similar import.

SUMMARY OF THE INVENTION

The objects and purposes of this invention, including those specified above, have been met by providing a tube cutoff device which includes a rotatable cutter head formed substantially as a sleevelike body and having a retainer plate secured thereto for radially slidably supporting a cutter and a pair of support rollers in circumferentially spaced relationship. A stationary tubular guide extends through the cutter head for permitting a tube to be fed therethrough and positioned between the cutter and the support rollers for engagement therewith. A cam is rotatably supported on the cutter head and cooperates with the cutter and rollers for displacing same radially inwardly into engagement with the tube which is to be cut. The cutter head and the cam are rotatably drivably connected to first and second power trains, respectively, which cause the cam and cutter head to normally rotate at the same rotational speed. A phase change device is coupled between the first and second power trains and, when activated, causes the second power train and hence the cam to be rotated at a slightly different rotational speed, which differential rotational speed causes the cutter and support rollers to be cammed radially inwardly for supporting and cutting engagement with the tube. The phase change device is activated by a driving arrangement which causes an initial radial displacement of the cutter at a higher speed until same is positioned substantially in engagement with the tube, following which the cutter is radially displaced inwardly at a slower speed to effect the desired cutting of the tube as the cutter undergoes several revolutions about the tube.

DETAILED DESCRIPTION

FIG. 1 illustrates therein an overall apparatus 10 for handling and cutting an elongated tube T into preselected lengths. This apparatus includes a spiral payoff stand 11 which stores the continuous tube in a substantially coiled form and supplies same to a two-plane straightener 12. This is followed by a feed device 13 which supplies the tube to a cutoff device 14, which device comprises the present invention. This device is followed by a runout table 16 which supports and receives the cut segment of the tube. A control panel 17 is also provided for controlling the operation of the overall apparatus.

Figure 2:
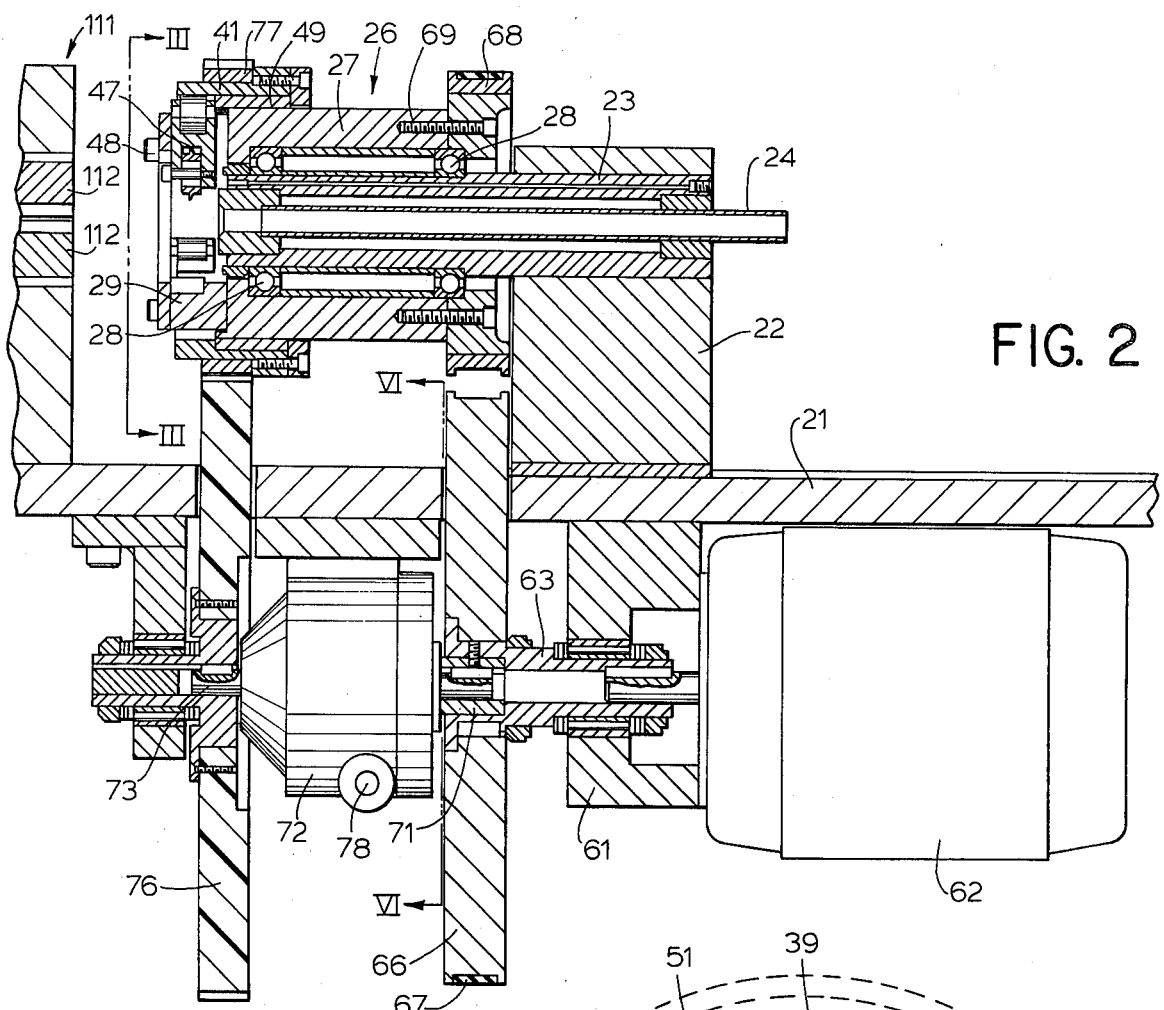
FIG. 2 is an enlarged, fragmentary sectional view of the cutting device.
Figure 3:
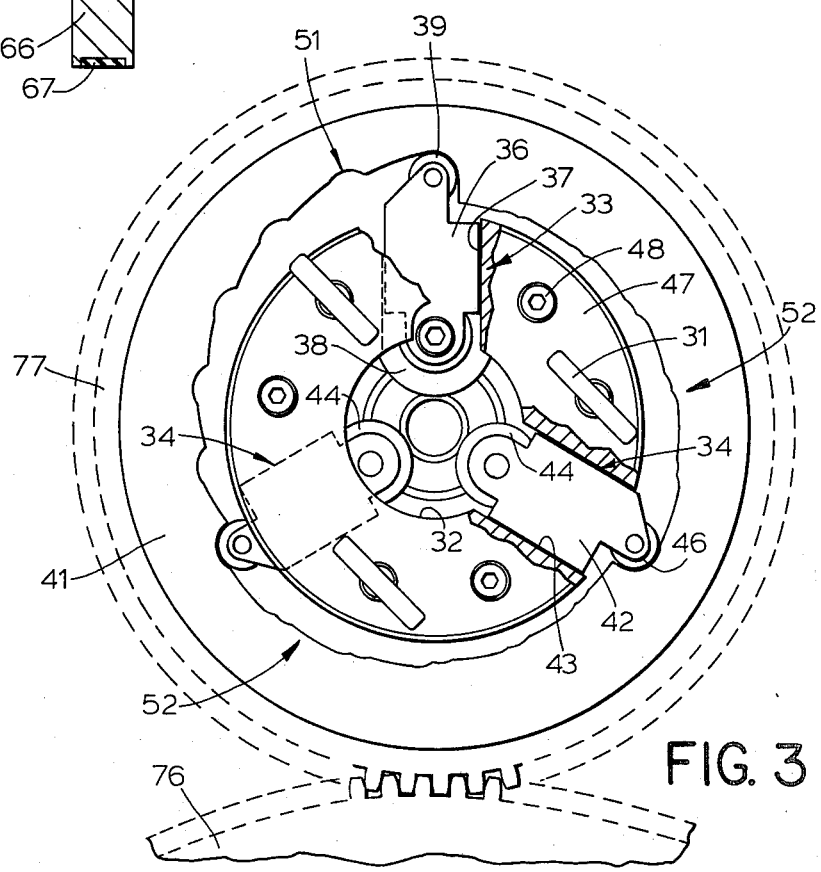
FIG. 3 is an enlarged, fragmentary view taken substantially along the line III—III in FIG. 2.

Considering the cutoff device 14, and referring specifically to FIGS. 2 and 3, same includes a frame 21 having an upwardly projecting pedestal 22 from which there projects a substantially horizontally extending support tube 23. This support tube 23 in turn stationarily supports therein an elongated tubular guide 24 which is used for guidably supporting the tube which is to be cut.

The support tube 23 rotatably supports thereon a cutting head assembly 26 which is rotatable about the horizontal longitudinally extending axis defined by the tubular guide 24. This head assembly includes a tubular body 27 rotatably supported on the support tube 23 by anti-friction bearings 28. An annular retainer plate 29 is fixedly secured to the forward end of the tubular body 27, as by a set of three thumb screws 31. These thumb screws cooperate with suitable threaded openings (not shown) formed in the forward end of the tubular body 27, which body has six sets of three such openings formed in a uniformly angularly spaced relationship therein for permitting the retainer plate 29 to be fixed to the tubular body 27 in six selected angular positions, for a purpose to be explained hereinafter. This retainer plate 29 has a central opening 32 which permits the tube to project therethrough.

The retainer plate 29 has a cutting tool assembly 33 and a pair of support roller assemblies 34 supported thereon in substantially equal angularly spaced relationship, which assemblies are all supported for radial sliding movement with respect to the retainer plate.

The cutter assembly 33 includes a carrier 36 which is radially slidably supported within a slot 37 which extends radially through the retainer plate. A substantially cylindrical cutter 38 is rotatably supported on the radially inner end of the carrier 36, which cutter is of a substantially conventional configuration in that it has a narrow blade which projects radially outwardly beyond the cylindrical profile of the cutter. The radially outer end of the carrier 36 is provided with a roller-type cam follower 39 rotatably supported thereon, which cam follower 39 is disposed for engagement with a surrounding ring-like cam 41.

Each of the support roller assemblies 34 is of a similar construction and includes a carrier 42 radially slidably supported within a slot 43 which extends radially through the retainer plate 29. The carrier 42 has a cylindrical support roller 44 rotatably supported on the radially inner end thereof, which roller is adapted to be moved radially inwardly into supporting engagement with the outer periphery of the tube which is to be cut. The radially outer end of the carrier 42 has a roller-type cam follower 46 rotatably supported thereon, which cam follower is also positioned in engagement with the surrounding ring cam 41.

An annular cover plate 47 is fixedly secured, as by means of screws 48, to the front face of the retainer plate 29 so as to close off the front side of the slots 37 and 43 and thereby slidably retain the assemblies 33 and 34 in the retainer plate. Removal of this cover plate 47, however, permits easy access to the assemblies 33 and 34 for maintenance purposes, particularly when removal of the cutter assembly 33 is desired for replacement and/or sharpening of the cutter 38.

Considering now the ring cam 41, same is rotatably supported on the tubular body 27, as by having a sleeve bearing 49 interposed therebetween. The forward end of the ring cam projects outwardly beyond the sleeve body 27 and has a cam series 51 formed on the inner periphery thereof and positioned for cooperation with the cutting tool assembly 33. The inner periphery of the ring cam 41 has a further pair of identical cam series 52 formed thereon, which cam series cooperate with the support roller assemblies 34.

Figure 5:
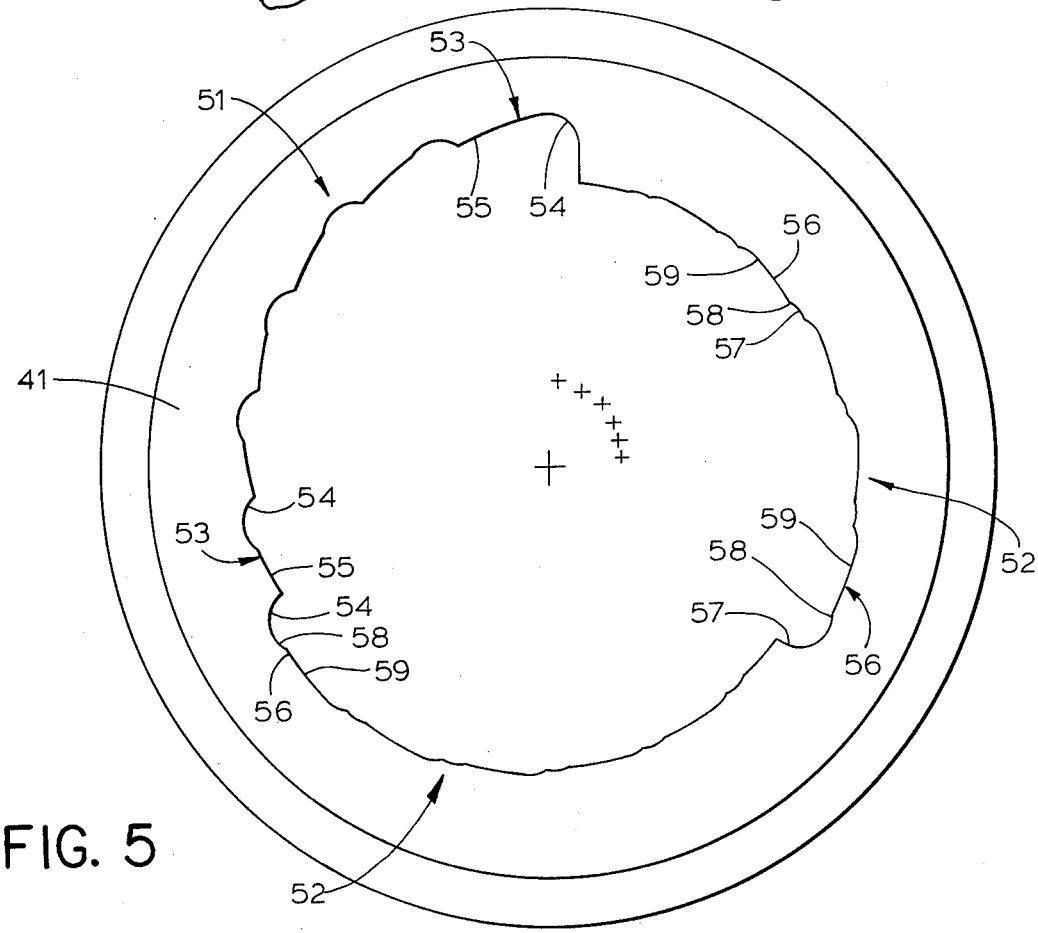
FIG. 5 is an enlarged view of the cam for activating the cutter.

The cam series 51, as illustrated in FIG. 5, is formed by a plurality of similar cams 53 which are series connected in the peripheral direction of the ring cam, there being six such cams spaced apart at angles of approximately 20° in the illustrated embodiment. Each cam 53 includes a recess 54 which defines a partial cylindrical seat adapted to cooperate with the cam roller 39. This recess 54 merges with a cam ramp 55 which slopes radially inwardly as it projects in the circumferentially extending direction of the ring cam. The recess 54 thus defines the radially outermost position of the cam follower 39 when engaged with the cam 53, whereby movement of the cam follower along the ramp 55 results in the cutting tool assembly 33 being cammed radially inwardly toward the rotational axis of the cutting head assembly. The individual cam ramps 55 are themselves generated as a circular arc, with the center point of the arcs for the six cams 53 defining a circular locus about the rotational axis, as indicated in FIG. 5.

Each cam series 52 includes a plurality of substantially identical cams 56 serially connected in the circumferentially extending direction of the ring cam, there being six such cams 56 spaced at 20° intervals in the illustrated embodiment. Each cam 56 includes a recess 57 which defines a partial cylindrical seat for engagement with the cam roller 44. This cylindrical seat or recess 57 in effect defines on one side thereof a small cam ramp 58 which terminates in an elongated cam dwell 59. This dwell 59, which is spaced radially inwardly from the outermost point of the recess 57, is generated on a constant radius about the rotational axis of the cutter head. Thus, when the cam follower 44 moves upwardly along the cam ramp 58, it causes radial inward displacement of the support roller assembly 33 until the follower 44 engages the dwell 59, which dwell then maintains the support roller assembly 34 in the previously reached position.

The six serially connected cams 53 in the series 51, and similarly the six serially connected cams 56 in each series 52, are progressively positioned closer to the rotational axis of the cutter head as these cams extends circumferentially (counter-clockwise in FIG. 5) about the ring cam. In this manner, the cam is usable for cooperation with tubes of substantially different diameters, in particular with six different diameter tubes in the illustrated embodiment, with the radially outermost cams cooperating with the largest diameter tube and the radially innermost cams cooperating with the smallest diameter tube. In the illustrated embodiment, the six serially connected cams associated with each series enables the cutting apparatus of this invention to be readily adjusted for use with tubes having an external diameter of $\frac{1}{2}$, $\frac{1}{2}$, $\frac{1}{2}$, 5/16, $\frac{1}{4}$ and 3/16 inch. Any other range of six diameters could also be provided.

The cutting head assembly 26 is rotatably driven at a relatively high speed, such as in the order of 1,600 to 1,800 RPM, by drive means 61 which includes a conventional electric drive motor 62 connected to a drive shaft 63. This shaft in turn is drivingly interconnected to the tubular body 27 by a first power transmission which includes a driving pulley 66 secured to the drive shaft 63 and drivingly connected by an endless belt 67 to a driven pulley 68. This latter pulley is in turn fixedly and nonrotatably secured, as by screws 69, to the tubular body 27 for causing rotation of the body 27 and the retainer plate 29, and the assmblies 33 and 34 mounted thereon.

The rotor 62 also causes rotation of the ring cam 41 by means of a second power transmission which, as illustrated in FIG. 2, includes a driving gear 76 which is coaxially aligned with the drive shaft 63 and is disposed in meshing engagement with a driven gear 77 which is concentric with and nonrotatably connected to the ring cam 41. The speed ratio defined by the gear transmission 76–77 is identical to the speed ratio defined by the belt transmission 66–68, so that whenever the driving pulley 76 and driving gear 77 are rotating at the same speed, then the tubular body 27 (and retainer plate 29) and ring cam 41 will also be rotating at the same speed.

To transmit driving torque from the motor 62 to the driving gear 76, there is provided a conventional phase changer 72 positioned between the pulley 66 and gear 76. This phase changer 72 has an input stub shaft 71 which is nonrotatably secured to the drive shaft 63, and also has an output stub shaft 73 which is nonrotatably secured to the driving gear 76.

The phase changer 72 is of a conventional differential gear construction such that, absent any secondary input, the output stub shaft 73 will rotate at the same speed as the input stub shaft 71 except that these stub shafts will rotate in opposite directions. Such phase changers are conventional, as above noted, and are sold for example by Candy Mfg. Company of Evanston, Illinois under the name of "Dynamic Differential."

Figure 6:
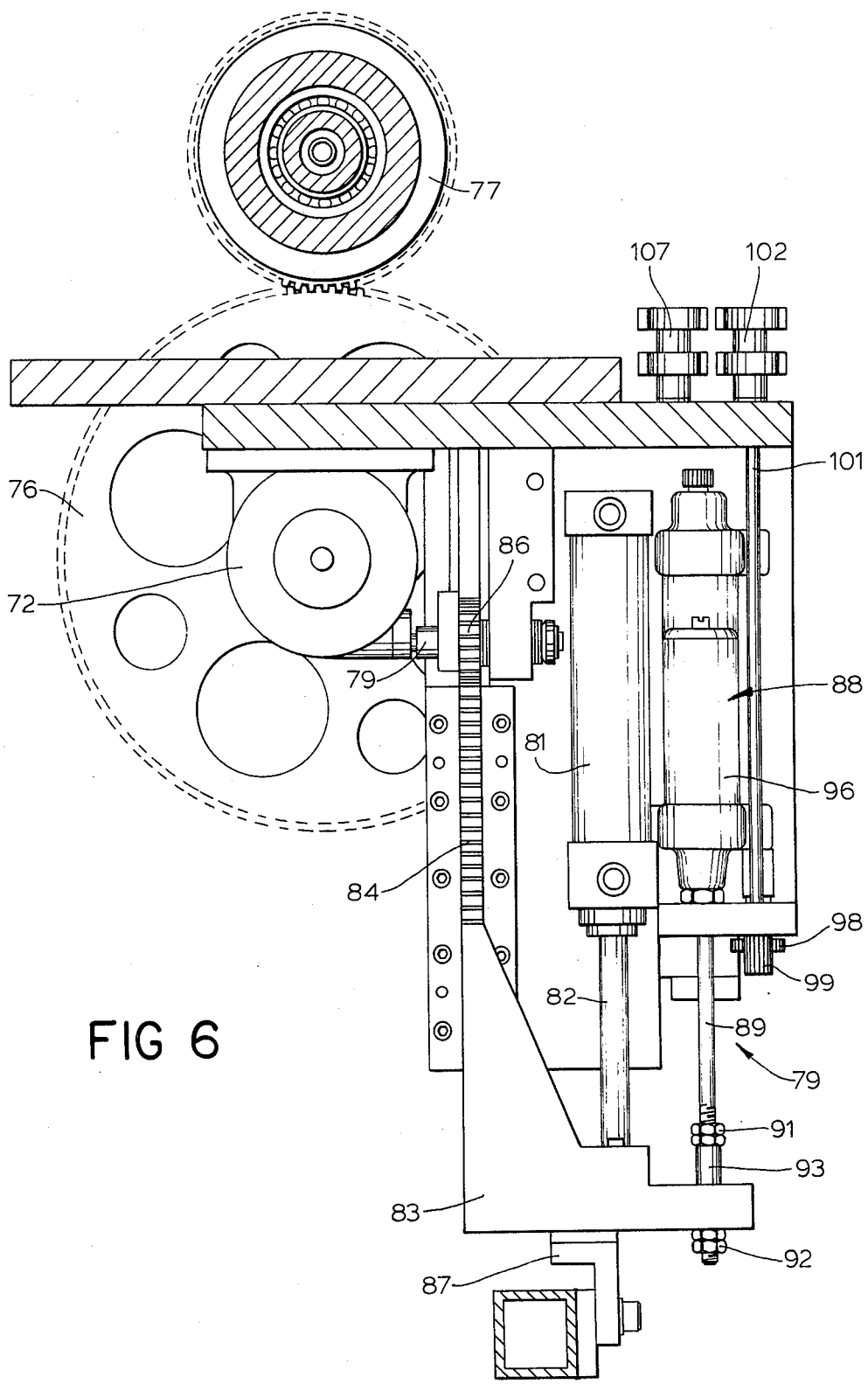
FIG. 6 is an enlarged view of the phase change drive, as taken substantially along the line VI—VI in FIG. 2.
Figure 7:
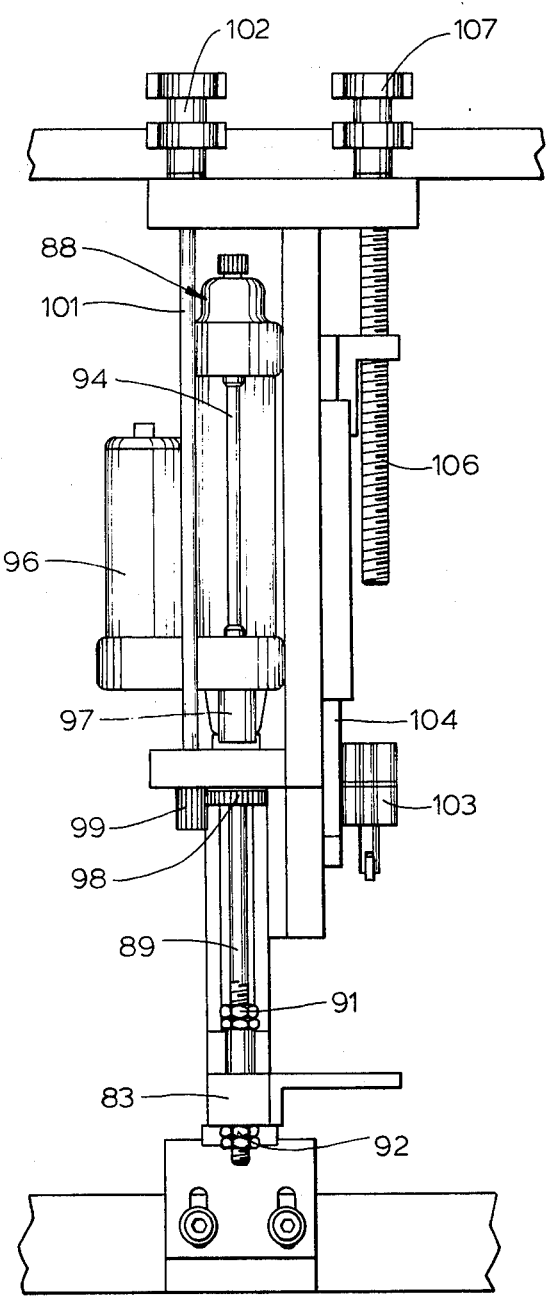
FIG. 7 is a right side view of the phase change drive illustrated in FIG. 6.

The phase changer 72 has a second input stub shaft 78 which extends perpendicularly with respect to the stub shafts 71 and 73. This second input shaft 78 is connected to a phase changer drive 79 (FIGS. 6 and 7) for selectively imposing a second input into the phase changer 72, which thereby causes a rotational speed differential between the input and output stub shafts 71 and 73.

The phase changer drive 79 includes a fluid pressure cylinder 81 which is mounted with its housing fixedly secured to the frame. This cylinder 81 has an extendable reciprocal piston rod 82 which is fixed at its lower end to the reciprocating slide 83. This slide in turn has a gear rack 84 fixed thereto, which gear rack is elongated in a direction substantially parallel to the direction of movement of the slide and is positioned in meshing engagement with a gear 86 which is nonrotatably secured to the second input stub shaft 78. The power cylinder 81 is normally maintained in a fully extended position wherein the slide 83 buts against a stationary stop 87.

The phase change drive 79 also has means associated therewith for permitting the gear rack, and hence the phase change effected thereby, to be accomplished at two different speeds, initially at a higher speed followed by a slightly reduced speed during the actual tube cutting operation. The means for accomplishing this involves the use of a fluid cushioning device 88 which is of conventional construction.

The cushioning device 88 has the housing thereof stationarily mounted on the frame and contains therein a movable piston which is connected to a reciprocal piston rod 89 which extends outwardly from one end of the housing. A pair of axially spaced stop nuts 91 and 92 are mounted on the piston rod adjacent the free end thereof, and confined an intermediate slide rod 93 therebetween. This slide rod 93 in turn slidably extends through a part of the slide 83 so as to create a slidable lost-motion connection with the slide, with the extent of the lost motion being determined by the spacing between the stop nuts 91 and 92.

The cushioning device 88 has a conduit portion 94 which enables the cushioning fluid to escape from the upper end of the housing, such as when the piston is moved upwardly, and flow into a separate reservoir 96. A conventional adjustable needle valve 97 is associated with the conduit for controlling the flow therethrough into the reservoir. This needle valve is adjusted by rotation of a gear 98, which in turn is driven by a pinion 99 secured to an elongated shaft 101 having an external nob 102 on one end thereof. This structure permits the needle valve to be selectively adjusted, which in turn controls the flow rate through the conduit into the reservoir to thereby adjust the dampening or braking effect exerted by the cushioning device on the slide 83 during the upward movement thereof.

To control the uppermost position of the phase changer drive, there is also provided a limit switch 103 positioned for contact with the slide 83 when the latter is in its uppermost position. This limit switch 103 is mounted on an adjustment slide 104 which is displaceable in a direction parallel to the direction of movement of the slide 83. The adjustment slide is threadably connected to an adjusting screw 106 which is provided with a nob 107 on the free end thereof, whereby rotation of this screw hence adjusts the position of the slide 104, which thereby changes the position of the limit switch 103.

To permit holding of the tube T during cutting thereof, there is additionally provided a clamping structure 111 (FIG. 2) disposed closely adjacent and slightly downstream of the cutting device. This clamping structure includes a pair of opposed and relatively movable clamping jaws 112 which are adapted to clampingly grip the tube therebetween. These jaws are relatively moved toward one another into clamping gripping engagement with the tubular element by means of a conventional fluid pressure cylinder.

OPERATION

The operation of the present invention will be briefly described to insure a complete understanding thereof.

A length of tube T is withdrawn from the payoff stand 11 and sent through the two-plane straightener 12 and is then advanced into and through the tubular guide 24 associated with the cutoff device 14, with the tube being advanced sufficiently through the cutoff device into the runout table 16 such that the desired length of tube is disposed forwardly of the cutoff device. During this advancing of the tube T, the drive means 61 and particularly the motor 62 is continuously energized to cause relatively high speed rotation of the cutting head assembly. Further, the phase changer drive 79 is inactive during this state of the operation, being maintained in the normally extended position shown in FIGS. 5 and 6, so that the phase changer 72 is not activated so that the input and output stub shafts thus rotate at equal rotational speeds but in opposite direction. This thus results in the retainer plate 29 with the cutter and support roller assemblies thereon being rotated at the same identical speed as the ring cam 41. Due to effects of centrifugal force, the support roller and cutter assemblies are maintained in their radially outermost positions, so that the cam roller 39 and 46 are thus disposed in engagement with the recesses or cam seats 54 and 57, respectively.

After the tube has been suitably advanced through the cutting device 14, the clamping structure 111 is activated to clampingly hold the tube, whereupon the apparatus is then ready to initiate a tube cutting operation.

The phase change drive 79 is then activated which involves energization of the fluid pressure cylinder 81 so that the piston rod 82 and slide 83 are thus pulled upwardly away from the stop 87. During this initial lifting of the slide 83, same freely slides along the intermediate slide rod 93 from a position adjacent the lower stop nut 92 upwardly toward the upper stop nut 91, so that the cushioning device 88 is thus not activated. The slide 83 is thus moved upwardly at a relatively rapid rate, which movement is transferred from the gear rack 84 to the gear 86, causing a rotation of the seondary input stub shaft 78 associated with the phase changer 72. This rotation of the secondary input shaft 78 due to the differential gear construction of the phase changer, thus causes the output stub shaft 73 to be rotatably driven at a rotational speed which is slightly different from that of the input stub shaft 71. There thus exists a small rotational speed differential between the input and output shaft 71 and 73, which differential also exists between the driving pulley 66 and driving gear 76. Because of this, the ring cam 41 and the retainer plate 29 likewise have a small rotational speed differential therebetween, so that the cam ring thus rotates relative to the retainer plate, whereby the cutter and support roller assemblies 32 and 33 are thus cammed radially inwardly toward the tube. During this initial relative rotation, which occurs as the slide 83 moves upwardly into engagement with the upper stop nut 91, the cam follower 39 associated with the cutter moves upwardly along the camming ramp 55 so that the cutter is moved radially inwardly into a position wherein it is disposed closely adjacent or lightly in engagement with the tube. At the same time, the cam followers 44 associated with the support roller assemblies are likewise cammed upwardly by the ramps 58 onto the dwell portions 49. The cam portions 58 cause the support roller assemblies to be moved radially inwardly a sufficient extent to cause the cylindrical support rollers 44 to supportingly engage the periphery of the tube, with the rollers being maintained in this supportive engagement position by the dwell portions 59.

After reaching the intermediate position as described above, the pressure cylinder 81 continues to move the slide upwardly, which slide now contacts the stop nut 91 and thus also causes a corresponding upward movement of the piston rod 89 associated with the cushioning device 88. The cushioning device 88 is thus activated and imposed a braking or retarding force on the slide 89, thereby restricting the further upward movement of the slide so that same thus continues to move upwardly at a reduced velocity.

During the continued upward movement of the slide 89 at the reduced velocity, due to the activation of the cushioning device 88 as described above, the rack 84 continues to rotate the gear 86 and thereby supply a secondary input to the phase changer 72, whereby a speed differential still exists between the input and output of the phase changer although this speed differential is reduced during this secondary phase of the operation. This speed differential, however, still results in a speed differential existing between the cam ring 41 and the retainer plate 29, whereby the cam roller 39 associated with the cutting tool assembly 33 continues to move upwardly along the ramp 55, whereby the cylindrical cutter 38 is thus progressively forced radially inwardly so as to penetrate the wall of the tube. Since this progressive inward radial penetration of the cutter occurs as the cutter itself rapidly rotates around (that is, orbits) the tube, this thus results in a progressive cutting of the wall of the tube until same is completely severed. During this cutting operation, the support roller assemblies remain radially stationary inasmuch as their cam followers 44 remain in engagement with the constant radius dwells 59.

When the cutting operation has been completed, the slide 89 reaches its uppermost position as determined by the limit switch 103, whereupon the power cylinder 81 is then energized in the reversed direction so that the phase changer drive is thus returned into its normal lowermost position, which return movement occurs at a higher speed inasmuch as the cushioning device 88 acts solely in one direction and hence imposes no restriction or braking force during the return movement. During this return movement of the phase changed drive, the secondary input to the phase changer 72 is obviously rotatably driven in the reverse direction, so that the rotational speed differential between the input and output of the phase changer is thus likewise in the reverse direction whereby the relative rotation between the retainer plate and the cam ring also is in the reverse direction, thereby returning the cam ring and the phase changer into the original position as shown in FIG. 3. When reaching this position, the cutting element and support roller assemblies 33 and 34 are automatically moved radially outwardly into their outermost positions due to the rotational effects of centrifugal force.

Following completion of the cutting cycle, as noted above, the clamp structure 111 is released and the tube advanced forwardly a preselected length and again clamped, following which the cutting operation is again carried out in the above-described sequence.

Thus, the operation of the cutting device according to the present invention is highly advantageous since the cutter and support rollers can be radially shifted inwardly into their operative positions merely by causing a slight rotational speed differential between the retainer plate and the ring cam, both of which are rotating at high speed. Since the speed differential between the retainer plate and the ring cam is extremely small in relationship to the speed of the retainer plate, the support rollers and cutter can thus be moved in a very controlled manner into engagement with the tube, and at the same time the cutter will undergo several revolutions around the tube so as to effect cutting thereof. The use of this phase change device for activating the cutting structure also enables a rapid advance of the support rollers and cutter into engagement with the tube, with the radial advance of the cutter into the tube during the actual cutting operation then being substantially reduced to result in a most desirable cutting of the tube so as to produce a cut edge which is relatively free of burrs.

Figure 4:
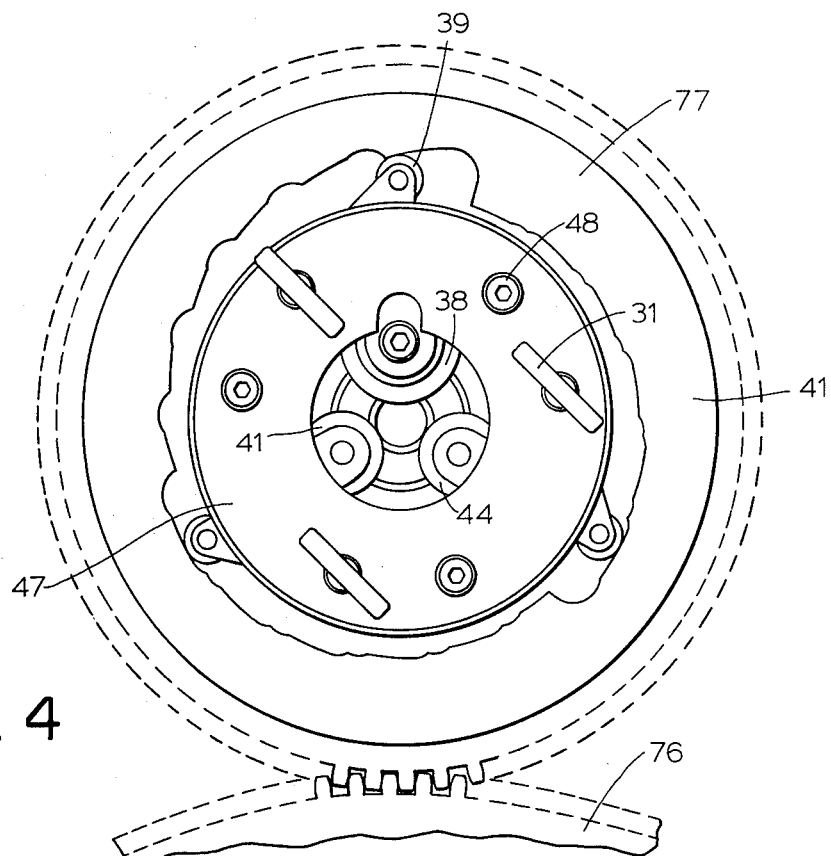
FIG. 4 is a view similar to FIG. 3 but showing the cutter in its activated or tube cutting position.

While the drawings, particularly FIGS. 3 and 4, illustrate the cutter and support roller assemblies 33 and 34 positioned for engagement with the outermost cams, whereby the device is thus positioned for cutting the largest diameter tube, this structure can also be easily adjusted to accommodate smaller diameter tubes. This can be accomplished by loosening and removing the three thumb screws 31, following which the retainer plate 29 is thus angularly rotated through steps of 20° until the cam followers 39 and 44 are positioned in the desired set of cams, following which the thumb screws 31 are then reinserted through the openings in the retainer plate and threadably connected to the aligned openings formed in the adjacent end of the tubular body 27. Thus, the cutting device can be adjusted to accommodate tubes of different diameter in a simple and efficient manner without requiring any major disassembly of the machine, or without requiring any extended shutdown of the machine.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for cutting a tubular element, said apparatus having a frame, means associated with said frame for holding an elongated tubular element, and a rotatable cutting head assembly positioned in surrounding relationship to said tubular element and rotatable about an axis substantially aligned with the axis of said tubular element, said cutting head assembly including rotatable support means having a rotatable cutting element mounted thereon for rotation therewith, and mounting means coacting between said cutting element and said support means for permitting said cutting element to move radially inwardly into rolling engagement with the tubular element to effect cutting thereof as the cutting element rolls therearound due to rotation of said support means, the improvement comprising ringlike cam means concentrically rotatably supported on said support means, said cam means having a cam surface cooperating with said mounting means for causing the cutting element to be urged radially inwardly toward the tubular element so as to rollingly cuttingly engage same, and drive means for causing high speed rotation of said support means and said cam means, said drive means including first and second power transmission means respectively drivingly connected to said support means and said cam means for normally causing rotation thereof at the same rotational speed, said drive means also including phase change means coacting with at least one of said power transmission means for selectively causing a small rotational speed differential between said support means and said cam means, said speed differential causing said cam means to relatively rotate with respect to said mounting means for camming said cutting element radially inwardly for engagement with the tubular element.

2. An apparatus according to claim 1, wherein said first and second power transmission means respectively include first and second driving members which are coaxially rotatably supported, and said phase change means being drivingly connected between said first and second driving members.

3. An apparatus according to claim 2, wherein said phase change means comprises a differential gear mechanism drivingly connected between said first and second driving members, and a phase change driving means drivingly connected to said phase change means for supplying a second input motion thereto for causing the output of the phase change means to be different from the input.

4. An apparatus according to claim 1, including a drive device drivingly connected to said phase change means for varying the output rotational speed thereof, said drive device including reciprocating motor means drivingly interconnected to said phase change means.

5. An apparatus according to claim 4, wherein said reciprocating motor means includes a driving element which is reciprocal through a preselected distance as defined between first and second positions, said reciprocating motor means causing said driving element to be moved through an initial part of said distance at a first velocity, and retarding means coacting with said driving element for limiting same to a second velocity which is substantially less than said first velocity during the remaining part of said distance.

6. An apparatus according to claim 1, wherein said cam means includes a series of cams positioned in angularly spaced relationship and disposed at different radial distances from the rotational axis, and release means coacting between said cam means and said support means for permitting selective relative rotation therebetween for enabling said mounting means to cooperate with a selected one of said cam, whereby said apparatus can be adjusted to accommodate tubular elements of different diameters.

7. In a tube cutting apparatus, the combination comprising:
frame means, including tubular guide means defining an axis along which an elongated tubular workpiece is fed;
sleevelike head means rotatably supported on said frame means for rotation about said axis;
annular cam means rotatably supported for rotation about said axis, said cam means being disposed adjacent and coaxially aligned with said head means;
at least three workpiece engaging assemblies radially movably supported on said head means in angularly spaced relationship, each said assembly including a cam follower disposed in engagement with said cam means and a rollerlike engaging element adapted to be moved into engagement with said workpiece, at least one of said engaging elements comprising a cutting roller;
first rotatable motor means;
first power transmission means drivingly connected between said first motor means and one of said head and cam means for rotating same at a first rotational speed;
second power transmission means drivingly connected between said first motor means and the other of said head and cam means for normally rotating same at a second rotational speed which is equal to said first rotational speed;
drive means interconnected to said second power transmission means for causing variation in said second rotational speed so that it varies slightly from said first rotational speed to thereby cause said cam means to be angularly displaced about said axis relative to said head means;
said drive means including second motor means, and third power transmission means drivingly connected between said second motor means and said second power transmission means for permitting variation in said second rotational speed;
whereby the variation in said second rotational speed causes said anular displacement between said cam means and said head means so that said workpiece engaging assemblies are cammed radially inwardly toward the workpiece so that said cutting roller rollingly engages and cuts the workpiece as it rotates therearound.

8. An apparatus according to claim 7, wherein said second power transmission means includes a phase change device having a first input connected to and driven from said first motor means, a second input connected to said third power transmission means so as to be driven by said second motor means, and an output connected to said other of said head and cam means, whereby said first and second rotational speeds are equal when said second motor means is deenergized.

9. An apparatus according to claim 8, wherein said second motor means is reversible and is drivable through a preselected stroke length when energized, said stroke length including a first stroke portion during which the cutting roller is moved from its outmost position into a position closely adjacent and substantially in engagement with the workpiece and a second stroke portion during which the cutting roller cuts through the wall of the workpiece, and retarding means coacting with said second motor means for restricting the speed thereof only during said second stroke portion for limiting the cutting rate.

10. An apparatus according to claim 8, wherein said cam means has a series of cams cooperating with each of said cam followers, said series of cams comprising a plurality of substantially identical cams connected circumferentially in series with the individual cams being spaced at radially different distances from said axis, and adjusting means coacting between said cam means and said head means for permitting selective rotation therebetween for permitting the cam followers to be disposed in selective engagement with a respective one of the cams associated with each respective series so as to permit said apparatus to be usable with workpieces of different outside diameters.

11. An apparatus according to claim 7, wherein said cam means has a series of cams cooperating with each of said cam followers, said series of cams comprising a plurality of substantially identical cams connected circumferentially in series with the individual cams being spaced at radially different distances from said axis, and adjusting means coacting between said cam means and said head means for permitting selective rotation therebetween for permitting the cam followers to be disposed in selective engagement with a respective one of the cams associated with each respective series so as to permit said apparatus to be usable with workpieces of different outside diameters.

* * * * *